United States Patent [19]

Fitzner et al.

[11] 4,111,174
[45] Sep. 5, 1978

[54] IGNITION SYSTEM WITH IDLE SPEED GOVERNOR APPARATUS

[75] Inventors: Arthur O. Fitzner; Richard L. Sleder, both of Fond du Lac, Wis.

[73] Assignee: Brunswick Corporation, Skokie, Ill.

[21] Appl. No.: 756,649

[22] Filed: Jan. 4, 1977

[51] Int. Cl.$^2$ .............................. F02P 1/00; F02P 5/04
[52] U.S. Cl. .......................... 123/148 CC; 123/117 R
[58] Field of Search ............... 123/117 R, 102, 117 A, 123/148 CC, 148 AC, 149 R, 149 D

[56] References Cited

U.S. PATENT DOCUMENTS

| | | | |
|---|---|---|---|
| 3,046,962 | 5/1960 | Norris | 123/117 P |
| 3,486,491 | 12/1964 | White | 123/117 A |
| 3,738,339 | 6/1973 | Huntzinger et al. | 123/117 A |
| 3,739,759 | 6/1973 | Sleder | 123/148 CC |
| 3,741,185 | 6/1973 | Swift et al. | 123/149 R |
| 3,768,451 | 10/1973 | Okamoto | 123/117 A |
| 3,805,759 | 4/1974 | Fitzner | 123/117 R |
| 4,015,564 | 4/1977 | Fitzner | 123/148 CC |

*Primary Examiner*—Charles J. Myhre
*Assistant Examiner*—R. A. Nell
*Attorney, Agent, or Firm*—Andrus, Sceales, Starke & Sawall

[57] ABSTRACT

An alternator driven capacitive discharge ignition system includes a tachometer circuit monitoring the speed-dependent repetition rate of discharge at an internal trigger power supply, the tachometer circuit causing the triggering threshold bias to be reduced below idle speed to electronically advance the timing. The ignition circuit includes a triggering threshold bias capacitor in series the trigger pulse source and a trigger power supply having a pilot capacitor to alternately fire a pair of ignition silicon controlled rectifiers. The pilot capacitor is charged in series with an RC filter network of a "bucket" tachometer circuit to create a speed signal voltage proportional to engine speed with the pilot capacitor functioning as the bucket capacitor. The speed signal is a voltage which is positive relative to a common signal ground while the threshold bias capacitor voltage is negative relative to such signal ground. The speed signal is applied to the gate of a P-channel depletion-mode junction field-effect transistor (JFET). The source-to-drain channel of the transistor is connected in parallel with the threshold bias capacitor. Below a selected idle speed, the source-to-drain channel resistance provides a maximum bleed current to the threshold bias capacitor, thereby reducing the triggering threshold voltage and creating an automatic spark advance. As the engine speeds up, the source-to-drain resistance increases and virtually eliminate the bleed current at speeds slightly above idle.

18 Claims, 3 Drawing Figures

Fig. 2

IGNITION SYSTEM WITH IDLE SPEED GOVERNOR APPARATUS

BACKGROUND OF THE INVENTION

This invention relates to a solid state ignition system for internal combustion engines having an alternator power supply.

Capacitive discharge ignition systems for internal combustion engines provide highly reliable and satisfactory ignition and have been particularly satisfactory for two cycle engines used in recreational products such as outboard motors, snowmobiles, motor cycles and the like. Such ignition systems may employ a battery power supply with an auxiliary alternator for maintaining the battery fully charged. In smaller engines, such as employed in outboard motors or snowmobiles and the like, the alternator may be connected directly to the engine crankshaft and provide the sole power supply for the capacitive discharge ignition system. Generally, the capacitive discharge ignition system employs one or more energy storage ignition capacitors via the ignition transformers to the spark plugs of the internal combustion engine for discharge of the capacitor or capacitors at appropriate times for proper ignition of the combustible charges in the cylinders of the engine.

In some alternator driven systems, the engine flywheel is constructed with two separate sets of magnets; the first set to generate the appropriate charging voltages for the energy storage capacitor or capacitors, and the second set to generate the appropriate trigger pulses for firing of the controlled rectifiers.

In other alternator driven systems, the engine flywheel is constructed with only a single set of magnets to generate both the appropriate charging voltages and the appropriate trigger pulses.

In either type of system the trigger pulses are normally generated in a movable trigger pulse winding or coil arranged to allow angular movement both in a direction opposite to the flywheel rotation to mechanically advance the ignition timing and in a direction the same as the flywheel rotation to mechanically retard the ignition timing.

An example of a practical and highly satisfactory alternator driven system of the first type, utilizing two separate sets of magnets for the capacitor charging and the triggering, respectively, is disclosed in U.S. Pat. No. 3,805,759 which issued Apr. 23, 1974 to Arthur O. Fitzner. The triggering circuit of U.S. Pat. No. 3,805,759 includes a bias capacitor operationally in series with, and charged by, the trigger pulse winding. The output of the trigger pulse winding or generator changes with speed, and the bias capacitor is charged therefore in accordance with the speed of the engine. The capacitor is connected to effectively create a variable triggering threshold matching the varying output characteristic of the trigger pulse generator. This provides an essentially constant timing characteristic over the normal operating speed range for marine outboard motors and has been found to contribute to improved operation. The timing is, of course, then separately controlled by mechanically positioning of the trigger pulse winding means.

An example of a practical and highly satisfactory alternator driven ignition system of the second type, utilizing only a single set of magnets for both the capacitor charging and the trigger pulse generation is set forth in U.S. Pat. No. 3,937,300 which issued Feb. 10, 1976 to Richard L. Sleder et al.

Systems having only a single set of magnets as disclosed in U.S. Pat. No. 3,937,200 are advantageously employed on the smaller outboard motors which need no provisions for maintaining the charge of an external battery.

Although alternator driven capacitor discharge ignition systems provide highly satisfactory operation of internal combustion engines for outboard motors, snowmobiles and the like, smooth and particularly satisfactory engine operation may not be created under idle speed settings. The analysis of the inventors indicates that with pulse generator triggered capacitor discharge ignition systems, the timing characteristic automatically and adversely changes to some degree at the extremely low instantaneous speeds sometimes encountered at idle. This is true even with the use of the unique stabilizing circuit in U.S. Pat. No. 3,805,759. Generally, the timing characteristic, particularly at momentary speeds below the idle speed, includes an automatic retard of the spark or timing which is detrimental.

At idle, the flywheel speed varies as it rotates through one full revolution, slowing down as the engine compresses the combustible gases prior to maximum compression, perhaps speeding up very slightly as the peak of compression is passed, and them accelerating rapidly once the combustible gases are ignited.

The triggering threshold is set by the sum of the relatively fixed threshold of the controlled rectifier devices plus the variable threshold voltage contributed by the bias capacitor.

When the flywheel speed slows momentarily, as it tends to do just prior to ignition, the trigger pulse in the trigger coil, which is proportional to flywheel speed, will be weakened, and the timing will be retarded.

When the flywheel speed increases momentarily, as it tends to do immediately after ignition, the trigger pulse in the trigger coil will be strengthened and will tend to charge the bias capacitor accordingly. This will raise the variable threshold voltage in the bias capacitor and contribute to a more retarded ignition timing on the very next firing.

Overall, the result is to rapidly reduce the power output from the idling engine when the speed drops off momentarily, causing a less than desirable idle characteristic.

SUMMARY OF THE PRESENT INVENTION

The present invention is particularly directed to an alternator driven solid state ignition system having a pulse actuated discharge switch means and an engine driven pulse generator connected to actuate the solid state switch means for firing of the spark plugs, in combination with an automatic electronic idle speed governor means to provide smooth idle speed operation. The idle speed operation is improved by eliminating the undesired automatic electronic spark retard of the timing characteristic and, in fact, providing a significant advance in the timing at speeds below the desired idle speed.

Generally, in accordance with the present invention, a speed sensitive or monitor means is coupled to the engine and produces a threshold modification in the trigger circuit to create a distinct and significant advance at the spark at speeds just below idle speed, with a resulting programmed stabilization in engine operation at idle speed.

In a preferred and a unique embodiment of the present invention, a tachometer-type speed signal is developed from the charging and discharging surges of the tirgger power supply. The tachometer-type speed signal varies directly with the speed and is automatically strongly coupled to the trigger pulse circuit only below a selected minimum speed, preferably selected just below the idle speed. In a system employed a triggering threshold bias capacitor operatively in series opposition to the trigger pulse source, the inventors have found the timing characteristic may be appropriately modified by ahtomatically and rapidly reducing the bias voltage of such capacitor as the speed is reduced below the desired idle speed. In one embodiment of the present invention, the tachometer circuit may employ a bucket capacitor coupled to the trigger power supply for charging a resistor-capacitor filter network through suitable steering diodes. The resistor-capacitor filter network provides the voltage signal proportional to speed. A voltage-controlled "resistor" in the form of a field-effect transistor is connected in parallel with the threshold bias capacitor and at speeds below a selected speed becomes conducting to increase the drain or bleed of the bias capacitor. Above such selected speed, the "resistor" means effectively goes to a non-conducting state and the bias capacitor functions in the normal manner to maintain the essentially constant timing. Temperature stabilizing means may be provided, preferably in that portion of the circuit providing the voltage signal proportional to speed.

In a particularly unique embodiment of the present invention in an ignition system having a pilot capacitor to fire the selected ignition control rectifier, the pilot capacitor functions dually to provide energy storage for the firing of the selected ignition control rectifier and also as the bucket capacitor for the tachometer circuit, transferring an essentially constant bucketful of electrical charge to the resistor-capacitor filter network during each recharge following firing of an ignition control rectifier.

The pilot capacitor is charged in series with the RC filter network of the tachometer circuit to create a speed signal voltage proportional to the frequency of the charging, and thus proportional to speed. The speed signal is a voltage which is positive relative to a common signal ground while the bias capacitor voltage is negative relative to such signal ground. The speed signal is applied to control the conductivity of a silicon semiconductor means connected across the bias capacitor. The semiconductor means is selected to properly combine and respond to the opposite polarity of the speed signal and the bias capacitor voltage. A particularly unique and satisfactory semiconductor means is a P-channel depletion-mode junction field-effect transistor (JFET) in which a positive gate signal is operative to reduce the apparent conductivity of the source-to-drain channel of the transistor. The transistor source is connected to the common signal ground, which is also the positive terminal of the bias capacitor, and the transistor drain is connected to the negative side of such capacitor. The source-to-drain channel of the transistor is, therefore, connected directly in parallel with the bias capacitor. The speed signal will always be either a positive voltage or zero and is connected to the transistor gate. When the signal is zero, and thus the gate-to-source voltage is zero, the source-to-drain resistance is a minimum and the maximum drain or bleed current can flow to reduce the bias voltage on the bias capacitor which results in an automatic advance of the spark. As the engine speeds up, the speed voltage signal increases with a corresponding increased gate voltage which increases the apparent source-to-drain resistance and reduces the bleed-off current which can flow from the capacitor. By proper selection and design, the effect of the JFET is virtually eliminated at an engine speed increased slightly above idle speed, and the system continues to operate with the bias capacitor maintaining the highly desired and effective constant timing characteristic with speed.

The idle speed governor therefor electronically produces an automatic advance of the spark as the engine speed slows down below a selected speed.

The present invention thus provides a highly effective and relatively simple means for providing an electronic idle speed governor for stabilizing the operation of internal combustion engines particularly engines having trigger pulse means of finite trigger pulse slope and where controlled variation of the ignition system triggering threshold can provide the desired electronic spark advance for idle speed stabilization.

BRIEF DESCRIPTION OF THE DRAWINGS

The drawings furnished herewith illustrate the best mode presently contemplated by the inventors for carrying out the invention in which the above advantages and features are clearly disclosed as well as others which will be readily understood from the description of such illustrated embodiment.

In the drawings.

DESCRIPTION OF THE ILLUSTRATED EMBODIMENT

Figures 1, 3:
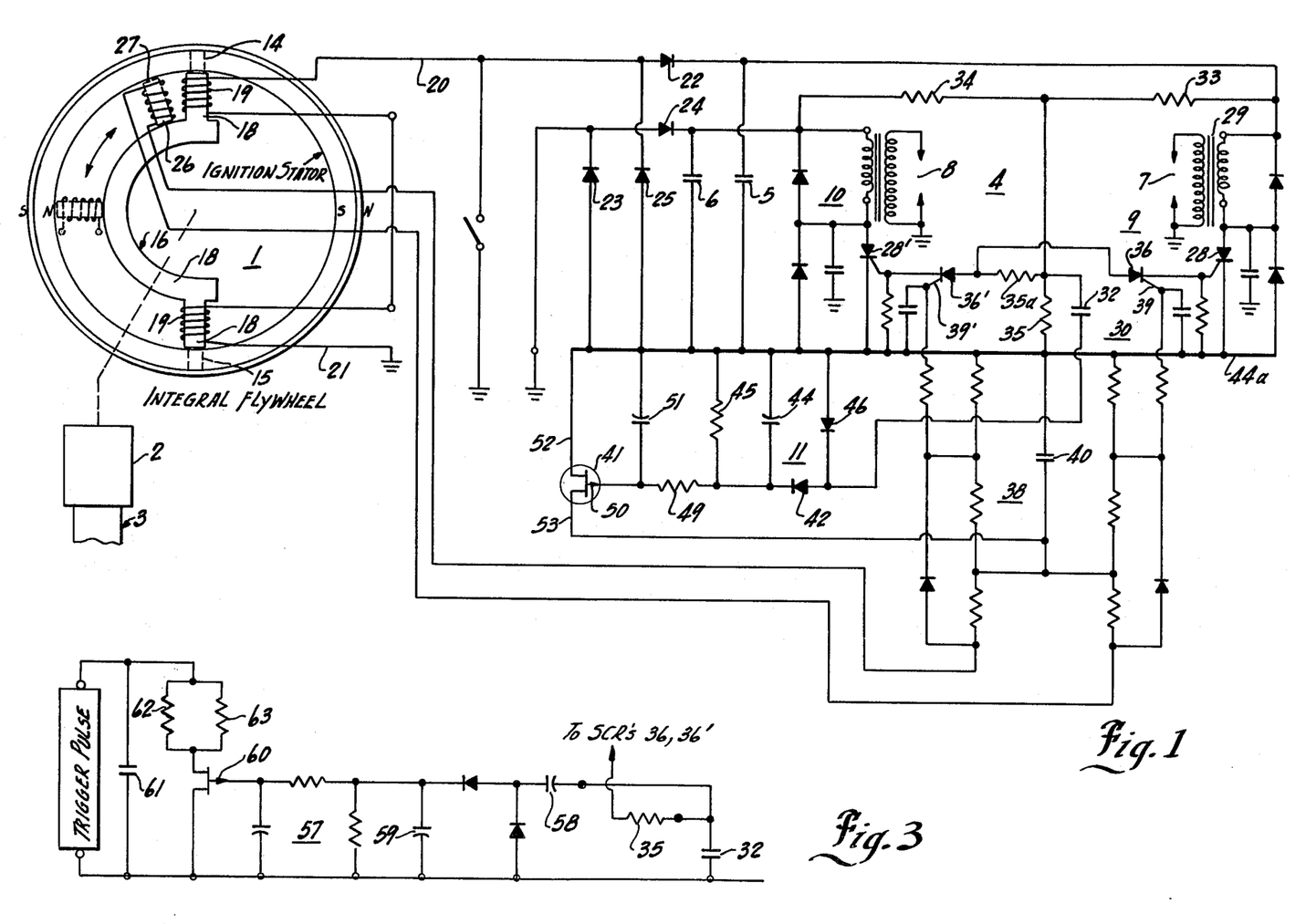
FIG. 1 is a schematic circuit diagram of an alternator driven capacitive discharge ignition system incorporating an idle speed governor circuit constructed in accordance with the present invention.
FIG. 3 is a schematic illustration of an alternate embodiment of the present invention.

Referring to the drawings, and particularly to FIG. 1, the illustrated embodiment of the invention includes an engine driven alternator unit 1 coupled to a two-cylinder engine 2 which may be mounted as the power head of an outboard propulsion drive unit 3. The outputs of alternator 1, comprising the capacitor charging output and the trigger pulse output, are connected to an ignition circuit 4 for firing of the engine 2. The ignition circuit 4 is a capacitive discharge system including a separage pair of ignition capacitors 5 and 6, which are alternately and cyclically charged and discharged from alternator unit 1 to an interrelated and connected spark plug 7 and 8 through suitable gated discharge circuits 9 and 10. The illustrated alternator unit 1 and ignition circuit 4 provide a highly satisfactory ignition system for normal operation. However, at engine idle speed, an uneven running condition is often encountered resulting from the creation of a retard of the spark. In accordance with this invention, an idle speed governor circuit 11 is connected to the discharging circuit means 9 and 10 and automatically and electronically changes the retard of the spark to an advance and thereby eliminates the adverse idle speed condition. The alternator unit 1 and the ignition circuit 4 employing the alternately operative capacitor 5 and 6 are similar to that shown in the previously identified U.S. Pat. No. 3,805,759 and the copending application of JAMES R. HAGER entitled MULTIPLE CAPACITOR MEANS IGNITION SYSTEM, filed on Jan. 19, 1976 with Ser. No. 650,418 and assigned to the same assignee. The ignition system is briefly described herein with sufficient detail to clearly describe and explain the illustrated embodiment of the present invention.

The alternator 1 includes a magnet secured within the engine flywheel and polarized radially of the rotor to define two distinct, circumferential magnets as at 12 and 13, which are oppositely and radially polarized to define a pair of flux reversal junctions 14 and 15 separated by 180°. A stator section 16 includes a semi-circular laminated core 17 having end poles 18, on which charging windings or coils 19 are wound. The core is semi-circular such that the coils 19 are also spaced by 180° and coupled twice in each complete revolution of the rotor to the flux reversible junctions 14 and 15.

The charging coils 19 are connected in series aiding between leads 20 and 21, the latter being connected to engine block ground. Lead 20 is connected to the topside of capacitor 5 by a charging diode 22 and the opposite side of capacitor 5 is connected by a diode 23 to ground and thus to lead 21. The voltage output of the windings 19 is thus directly connected to charge capacitor 5 when lead 20 is positive. Lead 21 is similarly connected to the topside of capacitor 6 via a diode 24, and lead 20 is connected to the bottom side at capacitor 6 by diode 25, to provide charging current to the ignition capacitor 6, when lead 20 is negative. The flux reversals of the junctions 14 and 15 are in opposite directions with respect to the coils 19 to generate opposite polarity pulses and thereby alternately charge the capacitors 5 and 6.

A trigger coil 26 is wound on a core 27 which is mounted for angular orientation between the stator poles 18 for sequential coupling to the flux reversal junctions 14 and 15. A trigger signal of opposite polarity is thus generated between the successive charging pulses. The successive opposite polarity triggering signals function to alternately fire the discharge circuits 9 and 10 for firing of the two spark plugs 7 and 8 of engine 2. The capacitors 5 and 6 are connected to the spark plugs 7 and 8 by similar circuits 9 and 10 and the circuit for capacitor 5 is described specifically, with corresponding elements of the circuit for capacitor 6 identified by corresponding primed numbers. The capacitor 5 is connected in series with an ignition control rectifier 28 and the primary of a pulse transformer 29. The secondary of the pulse transformer 29 is connected across the spark plug 7 and an ignition pulse is created by triggering rectifier 28 on. A trigger pulse circuit 30 is connected to the alternator unit 1 and particularly trigger winding 26 and to the rectifiers 28 and 28' to discharge the capacitors 5 and 6 at the appropriate time. In accordance with this invention, the idle speed governor circuit 11 is connected to the pulse circuit 30. A pilot pulse or trigger capacitor 32 is connected to be charged from the output of the alternator unit 1 simultaneously with the charging of either of the ignition capacitors 5 and 6. Capacitor 32 is charged from capacitors 5 and 6 through charging resistors 33 and 34 working into a common bleeder resistor 35. The resistance of the resistors 33 and 34 is high to prevent excessive discharge of the main firing capacitors 5 and 6 prior to firing. A pilot controlled rectifier 36 connects the trigger capacitor 32 to the gate 37 of the ignition controlled rectifier 28 for providing a powerful turn-on current pulse into the gate 37 of rectifier 28, limited mainly by resistor 35a. The trigger winding 26 is connected to turn on the pilot rectifier 36 and discharge the trigger capacitor 32.

The capacitor 6 is similarly discharged to fire spark plug 8, with the trigger capacitor 32 again providing an intermediate powerful trigger pulse source for controlled rectifier 28'. A capacitive-resistive coupling and timing stabilizing network 38 connects the trigger winding 26 to the pilot controlled rectifiers 36 and 36' with the trigger coil leads being connected via the coupling and stabilizing network 38 one each to each of the gates 39 and 39' of the pilot rectifiers 36 and 36'. The network 38 includes a triggering threshold bias, and timing stabilizing capacitor 40 to insure an essentially constant firing angle independent of speed. Advance and retard setting of the trigger coil 26 is separately controlled. This stabilizes the ignition angle generally as taught in U.S. Pat. No. 3,805,759, dated Apr. 23, 1974. The trigger coil 26 is movably mounted for limited angular orientation, preferably as a predetermined function of the throttle setting, for example, as disclosed in U.S. Pat. No. 3,937,200. The trigger coil 26 is illustrated in the FIG. 1 in maximum retard firing position and is coupled to the throttle for movement to a maximum advance firing position. In accordance with conventional practice, initial throttle movement only advances the timing to increase the speed and then further throttle movement opens the throttle plate in the carburetor in addition to advancing the timing. The unique idle speed governor of the present invention automatically and electronically modifies the timing characteristic during idle speed operation to similarly advance the spark only and thereby stabilize the engine operation.

Generally, in the illustrated embodiment of the invention, the idle speed governor circuit 11 is a "bucket" type tachometer circuit which is connected to the pilot trigger capacitor 32 to receive a pulse rate related charging signal. The output of the tachometer circuit is applied to a junction field-effect transistor 41 (JFET) which is connected as a variable bleed resistance means across the timing stabilizing threshold bias capacitor 40. Generally, as the engine speed slows down below the desired idle speed, the field-effect transistor 41 acts as a relatively heavy drain or bleed on the stabilizing capacitor 40. Any reduction in the bias voltage acts to lower the triggering threshold and automatically advance the spark. This, in turn, causes the engine speed to increase back toward the desired idle speed and effectively produces a much more constant engine idle speed. As the engine speed is deliberately increased by control of the throttle, the tachometer-type voltage signal correspondingly increases. The increased voltage signal on the field-effect transistor 41 increases its apparent resistance connected across the stabilizing capacitor 40 and at a speed very slightly higher than that of idle speed, the effect of JFET 41 is virtually removed from the circuit. The ignition system then operates to maintain an essentially constant timing over the normal operating speed of the engine, disregarding the angular repositioning of the trigger coil of course, as disclosed in the previously referred to patent.

The idle speed governor circuit of the present invention with its electronic adjustment of timing significantly improves the idle speed operation of the engine while still permitting the normal satisfactory stabilized timing operation of the engine at all other speeds.

More particularly, in accordance with the illustrated embodiment, the trigger capacitor 32 is coupled to the common signal ground through the idle speed governor unit 11 as follows. A diode 42 connects the negative side of the trigger capacitor 32 in series with a tachometer capacitor 44 to the common signal ground lead 44A. A resistor 45 is connected in parallel with capacitor 44, and a voltage proportional to the frequency of ignition system firing is developed on the tachometer capacitor. The resistor 45 in parallel with the capacitor 44, controls the time rate of discharge and thereby provides a means of calibrating the voltage on the tachometer capacitor 44 against speed. A trigger capacitor discharge diode 46 is connected between the junction of the trigger capacitor 32 with the diode 42 and the common signal ground lead 44A. When a pilot rectifier 36 is triggered, the trigger capacitor 32 is discharged through the common resistor 35A, the triggered rectifier 36, the gate-to-cathode circuit of the main silicon control rectifier 28 to the common signal ground lead 44A and back to the trigger capacitor 32 via the return diode 46. The positive side of the tachometer capacitor 44 is connected in series with a resistor 49 to the gate 50 of the JFET 41. A filter capacitor 51 is connected between the gate 50 and the signal ground lead 44A, and with the signal coupling resistor 49 constitutes a filter to remove much of the ripple of the tachometer voltage being supplied by capacitor 44.

The transistor 41 is a P-channel depletion mode junction field-effect transistor. The source 52 is connected directly to the signal ground lead 44A and consequently to the positive side of the bias capacitor 40 of the trigger circuit 11. The drain 53 of the field-effect transistor 41 is connected to the opposite or negative side of the bias capacitor 40. The cource-to-drain channel of the field-effect transistor 41 is thus connected directly in parallel with the capacitor 40 and depending upon its effective resistance may increase the discharge rate of the capacitor. A maximum drain or bleed-off current flows when the field-effect transistor 41 has zero voltage on the gate and a minimum current flows when a large positive voltage is applied to the gate 50. A junction field-effect transistor employs the characteristics of a reverse-biased junction to develop a depletion region between the source and the drain and thereby control the source-to-grain current. The P-channel junction field-effect transistor is ideally suited to the present application because the polarity relationships are uniquely suited to the application of employing the positive voltage developed by the tachometer signal capacitor 44 for controlling the negative voltage developed by the timing stabilizing capacitor 40.

In the illustrated embodiment of the invention, the tachometer voltage is either zero or positive. When the tachometer voltage is zero, the gate voltage is zero and the field-effect transistor exhisibts a minimum resistance between the positive source and negative drain conditions. As a result, the stabilizing capacitor 40 is subjected to a maximum discharge or draining current. This reduces the vias voltage of the timing stabilizing capacitor to a minimum level. Any reduction in such bias voltage automatically advances the triggering and the timing of the spark, thereby effectively increasing the engine speed. The tachometer voltage is small at idle and lower speeds and is set to a level to establish the required transistor conductivity by proper trimming of the calibration resistor.

As the engine speed increases, the tachometer voltage rises, providing a corresponding increased positive voltage on the gate. In accordance with the well-known characteristics of a JFET, the resistance of the flow path or channel between the source and drain increases and the drain current from the bias capacitor is correspondingly reduced. At engine speeds only slightly above idle operating speed the effective resistance of the JFET 41 increases such that the effect of the JFET is virtually absent.

Overall, the effect is to advance the spark as the engine slows down below the selected speed but conversely to completely eliminate the idle governor action as the engine speed increases above the selected speed.

The particular speed at which the effect of JFET 41 is effectively removed can be readily controlled by adjustment of the trimming resistor 45 connected in parallel with the tachometer capacitor 44. The trimmable resistor 45 is preferably of the type which may be machine trimmed to permit accurate and production adjustment of the idle speed governor circuit.

Thus, in the illustrated embodiment of the invention, the pilot or trigger capacitor 32 has the dual function of providing a pilot trigger pulse as in the prior art and further providing the function of a "bucket" capacitor for a tachometer circuit.

The voltage pulse generated by trigger winding 26 spans a finite number of crankshaft degrees and this pulse width is essentially a constant independent of engine speed. However, the amplitude of this voltage pulse is proportional to engine speed. Therefore, the slope (volts/degree) of the trigger voltage pulse is proportional to engine speed. At relatively low engine speeds such as around idle, the engine's ignition timing will retard due to the decreasing slope of the generated trigger voltage as the engine speed decreases. Instantaneous speed changes around idle are related to the varying cylinder pressures and the flywheel moment of inertia. Also, poor fuel distribution may contribute to relatively large instantaneous speed variations. If the timing retards as a function of decreasing speed, this characteristic will further contribute to uneven or poor idling of the engine.

Figure 2:
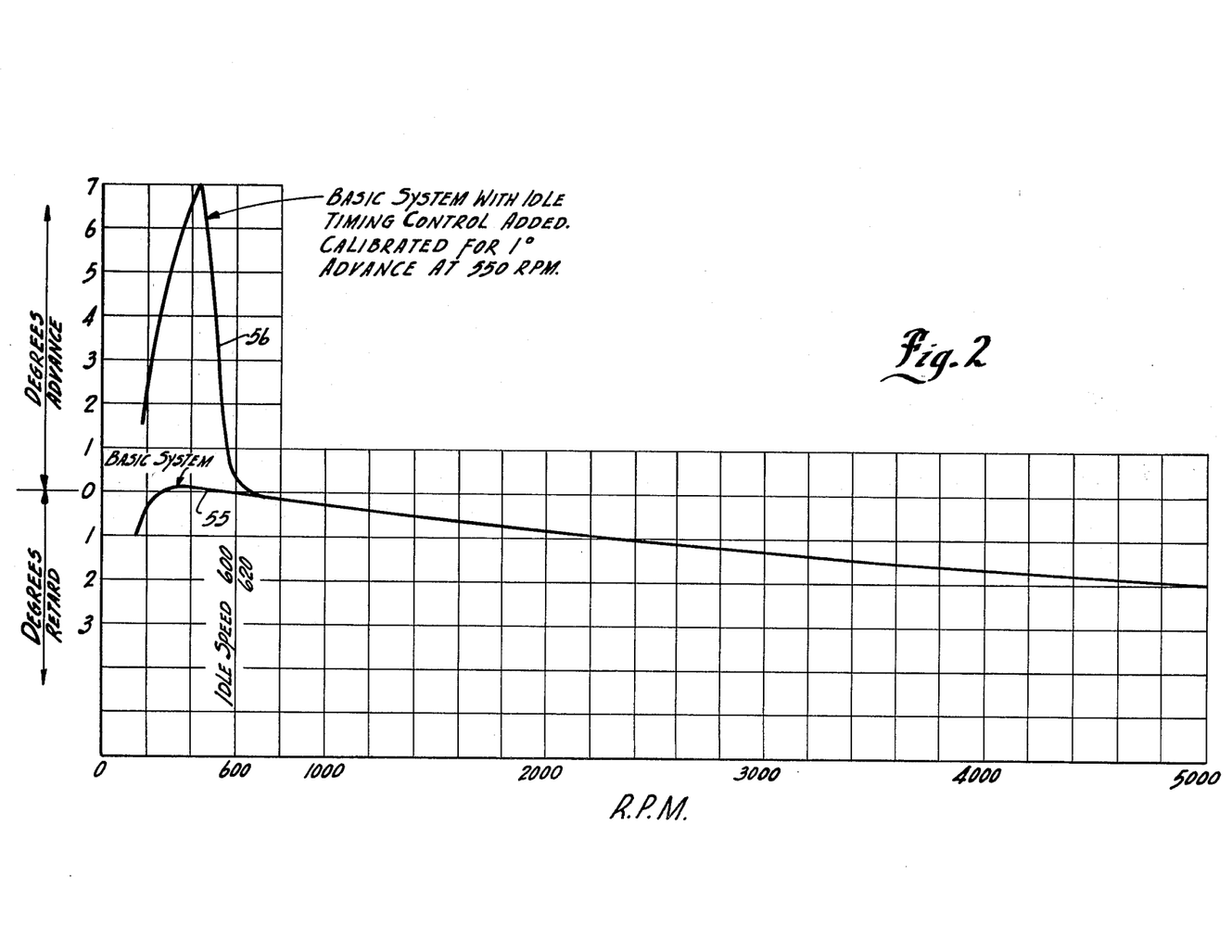
FIG. 2 is a graphical illustration of the timing characteristic of the ignition system with and without the idle speed governor circuit.

Without the idle governor circuit 11, the timing characteristic with the trigger coil 26 in a fixed position is typically as shown at 55 in FIG. 2. Idle speed is approximately 600 to 620 RPM. Below idle speed, the timing characteristic includes a very slight advance and then a relatively sharp retard as the speed further decreases. Above idle speed the angle of retard increases slowly and generally along a straight line curve. The characteristic above idle is highly satisfactory for smooth engine operation. The characteristic below idle speed, however, contributes to uneven running of the engine.

The idle speed governor circuit 11 drastically changes the timing characteristic immediately below the idle speed, as shown at 56, in FIG. 2, without changing the characteristic above idle speed, as also shown in FIG. 2. The governor, by drastically reducing the charge on the stabilizing capacitor 40 causes a very rapid advance in the timing as the speed decreases below idle speed. The timing advance tends to increase the engine speed and thereby produce a stable idle speed operation. The idle timing characteristic shown is typical of a four horsepower engine employed in small outboard motors and illustrates a characteristic particularly designed to establish one degree of advance at 550 RPM which rises rapidly to a peak of seven degrees at 400 RPM. This timing characteristic provides a relatively large timing advance with relatively small decreases in speed, such that the idle speed governor circuit is sensitive and highly responsive at speeds slightly below idle speed. Above idle speed the timing characteristic with and without the idle speed governor circuit are essentially identical.

However, a separate tachometer control system can, of course, be employed. For example, referring particularly to FIG. 3, a separate "bucket" tachometer circuit 57 is connected to the charging circuit and includes a separate "bucket" capacitor 58 connected directly to be charged in parallel with the trigger capacitor 32 and functions as a small "bucket" capacitor. The tachometer capacitor 59 is similarly connected in the circuit to the "bucket" capacitor 58 and to the gate of a field-effect transistor 60. In the embodiment of the invention shown in FIG. 3, a drain resistor 62 in parallel with a thermister 63 is connected in the drain lead. The thermister may be employed to provide additional temperature stabilization. The inventors have found that such a circuit is not necessary because satisfactory temperature stabilization may be provided by proper selection of the calibrating resistor and bucket capacitor.

The present invention thus provides a simple and reliable idle speed governor for solid state ignition systems having a retarding timing characteristic below idle speeds.

Various modes of carrying out the invention are contemplated as being within the scope of the following claims particularly pointing out and distinctly claiming the subject matter which is regarded as the invention.

We claim:

1. An ignition system for an internal combustion engine, comprising a solid state ignition circuit having a firing pulse source and output means adapted to be connected to the firing means of an internal combustion engine, said ignition circuit having a speed sensitive timing characteristic including retarded timing below a selected operating speed, said output means includes a gated switch means connected to said pulse source and to the firing means, a trigger pulse source means connected to the gated switch means for periodically actuating said switch means, and a speed sensing means connected to said solid state ignition circuit and including control means connected to said gated switch means and said trigger pulse source means and responsive to speed below said selected operating speed to electronically advance said timing characteristic to an advanced timing and thereby establish a smooth low speed operation.

2. The ignition system of claim 1 wherein said ignition circuit includes an ignition capacitor means, a capacitor charging means, a capacitor discharging means connecting said capacitor means to said output means and having a speed sensitive output creating said retarded timing, and said speed sensing means being connected to said discharging means and responsive to the rate of discharge of said capacitor means for speeds below said selected operating speed to modify the discharge time to provide said advanced timing.

3. The ignition system of claim 2 with a timing stabilizing capacitor connected to modify the effective timing threshold voltage of the gated switch means, a variable bleed means connected across said capacitor, and said speed sensing means being connected to actuate said bleed means to discharge the capacitor.

4. The ignition system of claim 2 wherein said charging and discharging means includes a gated discharge switch means and a trigger pulse source providing time spaced firing pulses for operating switch means and including a stabilizing trigger voltage means connected to be charged from said trigger pulse source, said speed sensing means includes a tachometer circuit means having a "bucket" capacitor charged by the ignition capacitor charging means, an electronic switch means connected to said tachometer circuit means and to said stabilizing trigger voltage means and actuating said electronic switch means to conduct below said selected engine speed and to turn-off in response to increasing speed and thereby reduce the effect of the stabilizing trigger voltage means only below said selected engine speed.

5. The ignition system of claim 2 wherein said firing capacitor means includes a pair of alternately charged and discharged capacitors, said discharging means includes a separated gated switch means for each capacitor and a common trigger capacitor connected to said capacitor charging means and charged simultaneously with each of said firing capacitors, a trigger pulse source having an output varying with speed and connected to alternately actuate said gated switch means, a timing stabilizing capacitor connected in series with the trigger pulse source to modify the timing characteristic and provide an essentially constant timing with speed above said selected level, said speed sensing means including a paralleled resistor and tachometer capacitor and a diode means coupling the tachometer capacitor to the trigger capacitor, the voltage of the tachometer capacitor being proportional to speed, a depletion mode junction field effect transistor having a gate connected to the tachometer capacitor and the drain and source terminals connected in parallel with the stabilizing capacitor.

6. The ignition circuit of claim 1 wherein said trigger pulse source means includes a trigger capacitor with a first polarity to signal ground and a stabilizing capacitor with an opposite polarity to signal ground, said control means including a depletion mode junction field effect transistor connected in parallel with the stabilizing capacitor and having a gate connected to said trigger capacitor.

7. The ignition circuit of claim 1 wherein said speed sensing means including a bucket capacitor connected to said pulse source, a tachometer capacitor, a diode means connecting the tachometer capacitor in series with said bucket capacitor, and means to connect the control means to the tachometer capacitor means.

8. A capacitor discharge ignition system for a two cycle internal combustion engine comprising an ignition capacitor means, an alternator means connected to charge said capacitor means, a capacitor discharge means connect to discharge said capacitor means having a trigger pulse source means operated in synchronism with the engine and produce a timing characteristic including retarded timing at speed below the idle speed of the engine, speed signal means connected to said discharging means and producing an electrical signal proportional to the rate of discharging of said capacitor means, and control means connected to said discharge means and to said speed signal means and responsive to said electrical signal to electronically advance said timing characteristic from said retarded timing only below idle speed and establishing smooth idle speed operation.

9. The ignition system of claim 8 wherein said pulse source means includes a trigger pulse generator and including a timing stabilizing capacitor connected to modify the output of the pulse generator and thereby the effective timing, said control means including a variable bleed means connected across said capacitor, and said speed sensing means including a tachometer circuit connected to actuate said bleed means.

10. The ignition circuit of claim 8 wherein said speed sensing means develops a control signal at 600 rpm and produces a one degree advance at 550 rpm and a significantly higher peak advance at 400 rpm.

11. The ignition circuit of claim 8 wherein the control means generates an advance peak of seven degrees below said idle speed.

12. The ignition system of claim 8 wherein said speed sensing means is a tachometer circuit means having a bucket capacitor charged by the ignition capacitor charging means to provide a stabilizing trigger voltage means, said control means is an electronic switch means connected to said tachometer circuit means and to said trigger pulse source means and actuating said electronic switch means to conduct below idle engine speed and to turn off in response to increasing speed and thereby reduce the effect of the stabilizing trigger voltage means only below idle engine speed.

13. The ignition apparatus of claim 12 wherein said tachometer circuit includes a capacitor charged to a voltage proportional to speed.

14. The ignition system of claim 8 wherein said firing capacitor means includes a plurality of ignition capacitors, steering diode means connecting the capacitors to said alternator, a trigger capacitor connected to said alternator and charged simultaneously with each of said firing capacitors, a pilot controlled rectifier means connected to discharge siad trigger capacitor, said trigger pulse source having an output varying with speed, a timing stabilizing capacitor connected in series with the trigger pulse source and the pilot controlled rectifier whereby the voltage on said stabilizing capacitor affects the timing of the discharging of the ignition capacitors, said control means including a field effect transistor connected in parallel with said stabilizing capacitor and discharging said capacitor below idle speed.

15. The ignition apparatus of claim 12 wherein said speed sensing means includes a paralleled resistor and tachometer capacitor, a diode means coupling the tachometer capacitor to the trigger capacitor, the voltage of the tachometer capacitor being proportional to speed, said field effect transistor having a gate connected to the tachometer capacitor and the drain-to-source terminals connected in parallel with the stabilizing capacitor.

16. An ignition circuit for a two cylinder marine propulsion engine, comprising a first and a second ignition capacitor, a permanent magnet alternator having a charging winding and a movable trigger winding, a diode means connecting said ignition capacitors to the charging winding and charging the first capacitor from each first polarity voltage and the second capacitor from each second polarity voltage, a trigger capacitor connected to said ignition capacitors and charged simultaneously with each of said ignition capacitors, a paralleled resistor and tachometer capacitor and a diode means connecting the trigger capacitor to said ignition capacitor, first and second pilot controlled rectifiers connected to said trigger capacitor and to said ignition controlled rectifiers, said trigger winding having the opposite ends connected to said pilot controlled rectifiers and having a time stabilizing capacitor connected in series with the trigger winding whereby the voltage on said stabilizing capacitor affects the timing of the discharging of the ignition capacitors, the voltage of the tachometer capacitor being proportional to speed, a junction field effect transistor having a gate connected to the tachometer capacitor and the drain-to-source terminals connected directly in parallel with the stabilizing capacitor.

17. The ignition circuit of claim 16 wherein said tachometer capacitor voltage turns said transistor on at approximately 600 rpm and produces a one degree advance at 550 rpm.

18. The ignition circuit of claim 16 wherein the control means generates an advance peak of seven degrees below said idle speed.

* * * * *

UNITED STATES PATENT AND TRADEMARK OFFICE
CERTIFICATE OF CORRECTION

PATENT NO. : 4,111,174
DATED : September 5, 1978
INVENTOR(S) : ARTHUR O. FITZNER ET AL It is certified that error appears in the above-identified patent and that said Letters Patent are hereby corrected as shown below:

| | | | |
|---|---|---|---|
| Column | 2, | Line | 27, | after "and" cancel "them" and insert --- then ---; |
| Column | 3, | Line | 4, | before "power" cancel "tirgger" and insert --- trigger ---; |
| Column | 3, | Line | 12, | beginning of the line, cancel "ahtomatically" and insert --- automatically ---; |
| Column | 4, | Line | 53, | at the beginning of the line, cancel "separage" and insert --- separate ---; |
| Column | 4, | Line | 68, | before "5" cancel "capacitor" and insert --- capacitors ---; |
| Column | 5, | Line | 58, | after "A" (end of line) cancel "pllot" and insert --- pilot ---; |
| Column | 7, | Line | 35, | after "The" cancel "cource" and insert --- source ---; |
| Column | 7, | Line | 46, | before "current" cancel "to-grain" and insert --- to-drain ---; |

UNITED STATES PATENT AND TRADEMARK OFFICE
CERTIFICATE OF CORRECTION

PATENT NO. : 4,111,174
DATED : September 5, 1978
INVENTOR(S) : ARTHUR O. FITZNER ET AL It is certified that error appears in the above–identified patent and that said Letters Patent are hereby corrected as shown below:

| | | | | |
|---|---|---|---|---|
| Column | 7, | Line | 57, | after "transistor" cancel "exhisibts" and insert --- exhibits ---; |
| Column | 7, | Line | 61, | before "voltage" cancel "vias" and insert --- bias ---; |
| Column CLAIM 8 | 10, | Line | 56, | after "means" cancel "connect" and insert --- connected ---; |
| Column CLAIM 8 | 10, | Line | 59, | after "at" cancel "speed" and insert --- speeds ---; |

Signed and Sealed this

Twenty-second Day of May 1979

[SEAL]

Attest:

RUTH C. MASON
*Attesting Officer*

DONALD W. BANNER
*Commissioner of Patents and Trademarks*